United States Patent
O'Connor et al.

(10) Patent No.: US 9,821,746 B1
(45) Date of Patent: Nov. 21, 2017

(54) AIRBAG ASSEMBLY

(71) Applicant: Ford Global Technologies, LLC, Dearborn, MI (US)

(72) Inventors: Chris Stephen O'Connor, Livonia, MI (US); Jacob Wookeun Lee, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/271,470

(22) Filed: Sep. 21, 2016

(51) Int. Cl.
*B60R 21/205* (2011.01)
*B60R 21/01* (2006.01)
*B60R 21/16* (2006.01)

(52) U.S. Cl.
CPC ............ *B60R 21/205* (2013.01); *B60R 21/01* (2013.01); *B60R 2021/0104* (2013.01); *B60R 2021/01013* (2013.01); *B60R 2021/161* (2013.01)

(58) Field of Classification Search
CPC . B60R 21/205; B60R 21/217; B60R 21/2155; B60R 2021/2173
USPC ...................................... 280/728.2
See application file for complete search history.

(56) References Cited

U.S. PATENT DOCUMENTS

| | | | |
|---|---|---|---|
| 5,344,184 A * | 9/1994 | Keeler | B60R 21/045 280/730.1 |
| 5,511,850 A | 4/1996 | Coursey | |
| 5,609,363 A | 3/1997 | Finelli | |
| 6,283,500 B1 | 9/2001 | Eckert et al. | |
| 6,616,182 B2 * | 9/2003 | Woolley | B60R 21/205 280/728.2 |
| 6,722,691 B1 | 4/2004 | Haland et al. | |
| 6,951,348 B2 | 10/2005 | Enders | |
| 6,966,579 B2 | 11/2005 | Schneider et al. | |
| 6,983,954 B2 * | 1/2006 | Sakaguchi | B60R 21/205 280/728.2 |
| 7,874,576 B2 * | 1/2011 | Gandhi | B60R 21/203 280/728.2 |
| 8,246,074 B2 * | 8/2012 | Choi | B60R 21/205 280/728.2 |
| 9,221,418 B1 * | 12/2015 | Pline | B60R 21/217 |
| 9,248,799 B2 | 2/2016 | Schneider et al. | |
| 9,333,940 B2 | 5/2016 | Hicken et al. | |
| 2008/0079245 A1 * | 4/2008 | Bito | B60R 21/206 280/730.1 |
| 2015/0274116 A1 | 10/2015 | Jaradi et al. | |
| 2015/0307052 A1 | 10/2015 | Jaradi et al. | |

FOREIGN PATENT DOCUMENTS

| | | |
|---|---|---|
| DE | 10106661 A1 | 9/2002 |
| DE | 10325124 A1 | 12/2004 |
| DE | 102007032763 A1 | 1/2008 |

* cited by examiner

*Primary Examiner* — Faye M Fleming
(74) *Attorney, Agent, or Firm* — Frank A. MacKenzie; Bejin Bieneman PLC

(57) ABSTRACT

An instrument-panel assembly includes an instrument panel, an airbag housing supported by the instrument panel, an airbag supported by the airbag housing, and a rotatable connection rotatably supporting the airbag housing on the instrument panel. The instrument panel extends along a longitudinal axis. The rotatable connection is rotatable about a rotational axis transverse to the longitudinal axis.

20 Claims, 4 Drawing Sheets

US 9,821,746 B1

AIRBAG ASSEMBLY

BACKGROUND

Vehicles may be subject to impact testing. As one example, Federal Motor Vehicle Safety Standard (FMVSS) 208 provides a test procedure designed to simulate a frontal collision into, e.g., a wall. The test procedure provides that a test vehicle holding a test dummy as an occupant collides in a forward direction at 35 miles per hour into a stationary rigid barrier perpendicular to the path of the test vehicle. FMVSS 208 sets forth requirements for various measures of injury to the test dummy, simulating potential injury to an occupant of the vehicle, such as head injury criterion (HIC), chest deflection, and femur load.

One type of test, for example, simulates an impact to the test vehicle from another vehicle at an oblique angle. Specifically, the test procedure provides that a moving deformable barrier impacts the test vehicle with a speed of 56 miles per hour at an offset of 35% from a center of a front of the vehicle and at an angle of 15° from a vehicle-forward direction. One measurement for this test is a brain injury criterion (BrIC). The BrIC is a function of the maximum pitch, roll, and yaw of a head of the test dummy during the test, specifically, $$BrIC = \sqrt{\left(\frac{\omega_{x\,max}}{66.3}\right)^2 + \left(\frac{\omega_{y\,max}}{53.8}\right)^2 + \left(\frac{\omega_{z\,max}}{41.5}\right)^2},$$

in which $\omega_{xmax}$ is the maximum roll velocity, $\omega_{ymax}$ is the maximum pitch velocity, and $\omega_{zmax}$ is the maximum yaw velocity, all measured in radians per second.

DETAILED DESCRIPTION

Figure 1:
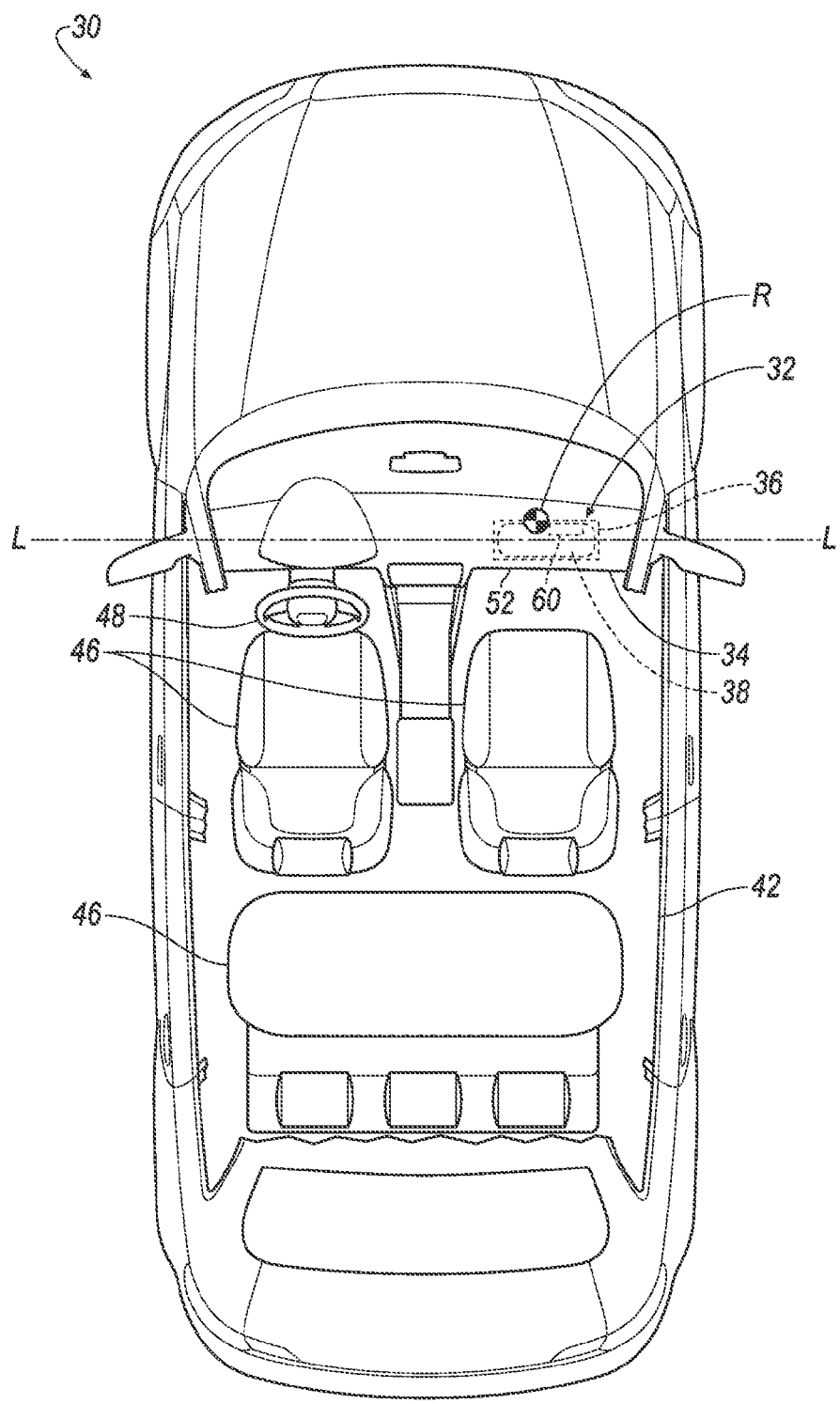
FIG. 1 is a cutaway top view of a vehicle to expose a passenger cabin for illustrative purposes.

With reference to the Figures, wherein like numerals indicate like parts throughout the several views, an instrument-panel assembly 32 includes an instrument panel 34, an airbag housing 36 supported by the instrument panel 34, an airbag 38 supported by the airbag housing 36, and a rotatable connection 40 rotatably supporting the airbag housing 36 on the instrument panel 34. The instrument panel 34 extends along a longitudinal axis L. The rotatable connection 40 is rotatable about a rotational axis R transverse to the longitudinal axis L.

The ability of the airbag 38 to rotate when a head 80 of an occupant travels into the airbag 38 reduces the brain injury criterion (BrIC) during an impact, such as a frontal oblique impact. Specifically, lateral momentum of the occupant is less likely to twist the head 80 of the occupant upon traveling into the airbag 38 because the airbag 38 moves laterally with the head 80 of the occupant. Reduced twisting of the head 80 of the occupant translates to a reduced BrIC, specifically, a reduced maximum yaw $\omega_{zmax}$.

With reference to FIG. 1, a vehicle 30 includes a passenger cabin 42 to house occupants, if any, of the vehicle 30. The passenger cabin 42 includes one or more front seats 44 disposed at a front of the passenger cabin 42 and one or more back seats 46 disposed behind the front seats 44. The passenger cabin 42 may also include third-row seats (not shown) at a rear of the passenger cabin 42. In FIG. 1, the front seat 44 is shown to be a bucket seat, but the seats may be other types. The position and orientation of the seats and components thereof may be adjustable by an occupant.

The instrument panel 34 may be disposed at a forward end of the passenger cabin 42 and face toward the front seats 44. The instrument panel 34 may extend along the longitudinal axis L lateral to a forward direction of the vehicle 30. The instrument panel 34 may include vehicle controls, including a steering wheel 48.

The instrument panel 34 may support a casing 50. The casing 50 may be shaped like, for example, a box with an opening facing rearward relative to the vehicle 30. The casing 50 may be disposed in the instrument panel 34 and may be covered by a panel 52 of the instrument panel 34.

The instrument panel 34 may support the airbag housing 36. The airbag housing 36 may be supported by and disposed in the casing 50, or the airbag housing 36 may be disposed in the instrument panel 34 without the casing 50. The airbag housing 36 may be shaped like, for example, a box with an opening facing rearward relative to the vehicle 30. In other words, the airbag 38 may be a passenger airbag, as shown in the Figures. As another example, the airbag 38 may be a driver airbag supported on the steering wheel 48, or any other type of airbag mounted at any location in the vehicle 30.

Figure 2:
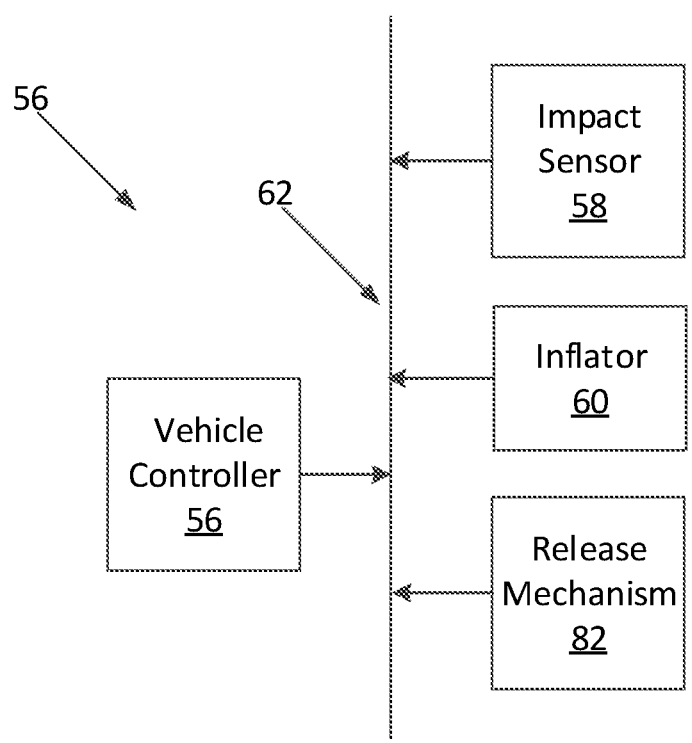
FIG. 2 is a block diagram of a control system of the vehicle.

With reference to FIG. 2, the vehicle 30 may include a control system 54. The control system 54 may include a vehicle controller 56, an impact sensor 58, an inflator 60, and a release mechanism 82, all in communication through a communications network 62.

The control system 54 may transmit signals through the communications network 62 such as a controller area network (CAN) bus, Ethernet, Local Interconnect Network (LIN), and/or by any other wired or wireless communications network.

The vehicle controller 56 may be a microprocessor-based controller. The vehicle controller 56 may include a processor, memory, etc. The memory of the vehicle controller 56 may include memory for storing instructions executable by the processor as well as for electronically storing data and/or databases. The vehicle controller 56 may be one of multiple controllers in the vehicle 30. The vehicle controller 56 may be, for example, a restraint control module.

The impact sensor 58 may be in communication with the vehicle controller 56. The impact sensor 58 is adapted to detect an impact to the vehicle 30. The impact sensor 58 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 58 may be located at numerous points in or on the vehicle 30.

With reference to FIGS. 1 and 2, the inflator 60 may be connected to the airbag 38. Upon receiving a signal from, e.g., the vehicle controller 56, the inflator 60 may inflate the airbag 38 with an inflatable medium, such as a gas. The inflator 60 may be, for example, a pyrotechnic inflator that uses a chemical reaction to drive inflation medium to the airbag 38. The inflator 60 may be of any suitable type, for example, a cold-gas inflator.

With reference to FIGS. 1 and 3A-5B, the airbag 38 may be supported by the airbag housing 36. The airbag 38 may be in fluid communication with the inflator 60. The airbag 38 may be inflatable from an undeployed position, as shown in FIG. 1, to a deployed position, as shown in FIGS. 3A-5B. In the undeployed position, the airbag 38 may be disposed within the instrument panel 34 and may be hidden by the panel 52 of the instrument panel 34. In the deployed position, the airbag 38 may extend rearward from the instrument panel 34 toward one or more of the front seats 44. The airbag 38 may have a conical shape at the airbag housing 36 in the deployed position; in other words, the airbag 38 may include a tapered section 64 adjacent to the instrument panel 34 in the deployed position.

The airbag 38 may be formed of any suitable airbag material, for example, a woven polymer. For example, the airbag 38 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The rotatable connection 40 rotatably supports the airbag housing 36 on the instrument panel 34. In other words, the rotatable connection 40 directly supports the airbag housing 36 on the instrument panel 34, or indirectly supports the airbag housing 36 on the instrument panel 34 through one or more intermediate components between the rotatable connection 40 and the instrument panel 34 and/or through one or more intermediate components between the rotatable connection 40 and the housing 36. The rotatable connection 40 is rotatable about the rotational axis R transverse to the longitudinal axis L, i.e., not parallel with the longitudinal axis L. The rotational axis R may be vertical, as shown in FIG. 1, or the rotational axis R may be angled in a vehicle-forward direction from a floor of the vehicle 30 to a roof of the vehicle 30, i.e., so that the airbag housing 36 is angled upwardly. The rotatable connection 40 is coupled to the airbag housing 36. The rotatable connection 40 may be coupled to the casing 50, or the rotatable connection 40 may be coupled to the instrument panel 34.

Figure 3A:
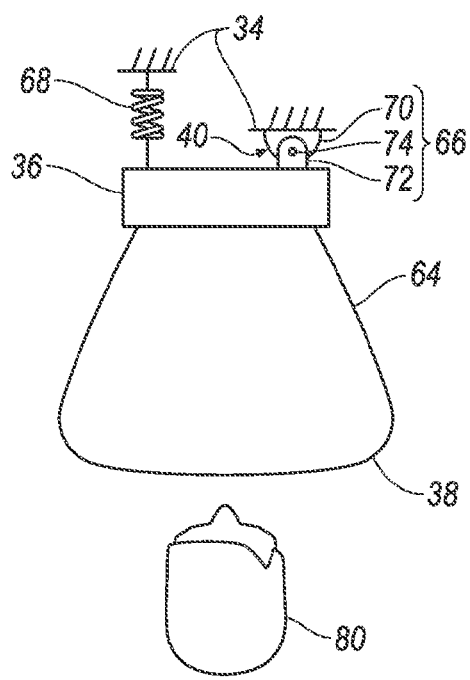
FIG. 3A is a top view of a first embodiment of an airbag assembly before an impact by a dummy head.
Figure 3B:
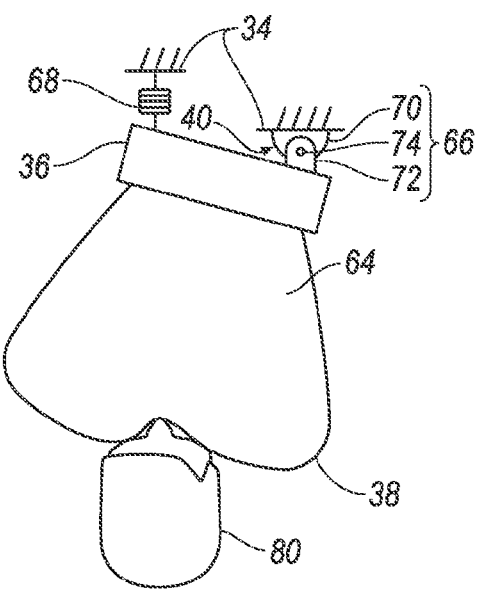
FIG. 3B is a top view of the first embodiment of the airbag assembly after the impact by the dummy head.
Figure 4A:
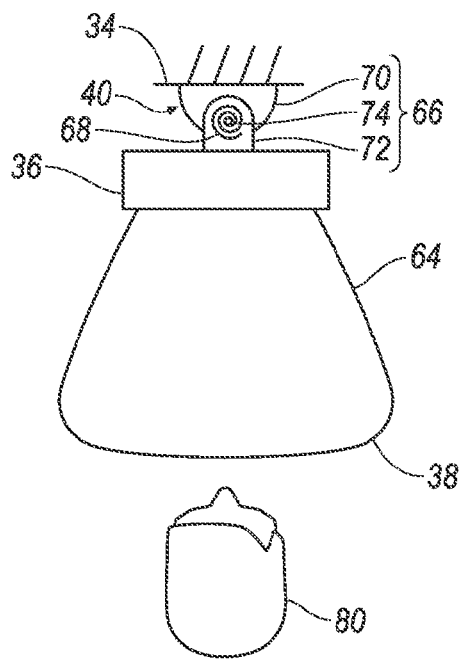
FIG. 4A is a top view of a second embodiment of the airbag assembly before an impact by the dummy head.
Figure 4B:
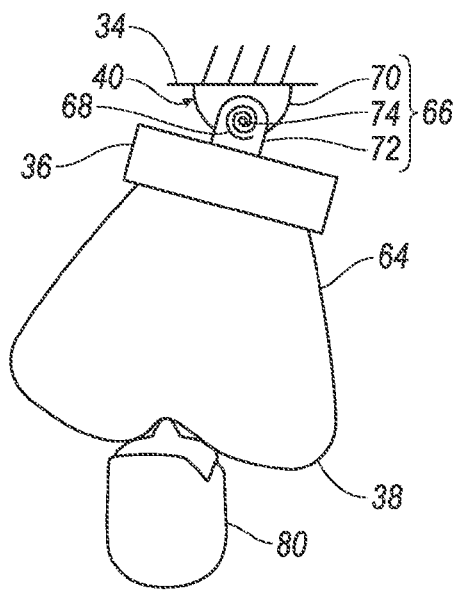
FIG. 4B is a top view of the second embodiment of the airbag assembly after the impact by the dummy head.
Figure 5A:
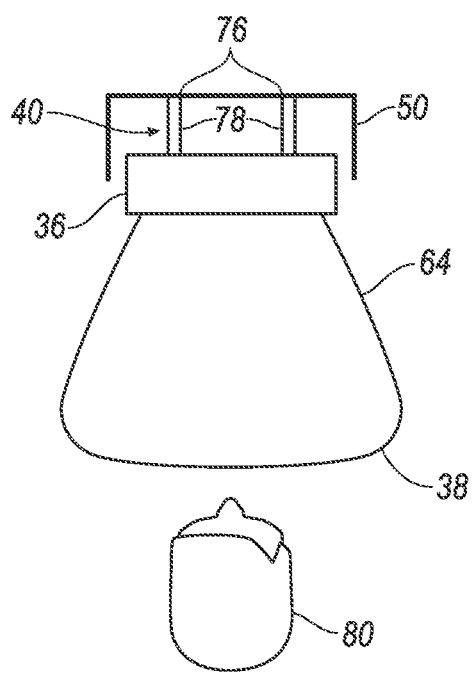
FIG. 5A is a top view of a third embodiment of the airbag assembly before an impact by the dummy head.
Figure 5B:
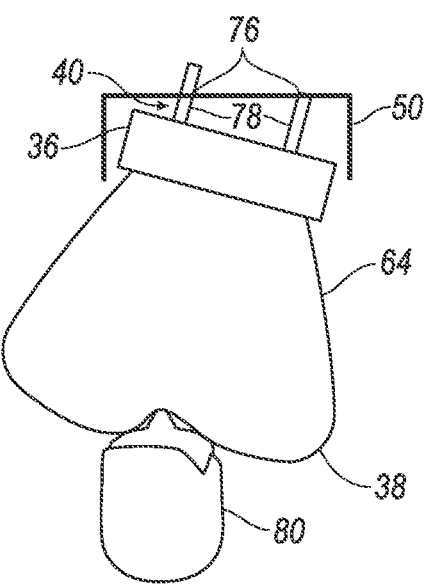
FIG. 5B is a top view of the third embodiment of the airbag assembly after the impact by the dummy head.

A first embodiment of the instrument-panel assembly 32 is shown in FIGS. 3A-B, a second embodiment of the instrument-panel assembly 32 is shown in FIGS. 4A-B, and a third embodiment of the instrument-panel assembly 32 is shown in FIGS. 5A-B. As set forth below, the first embodiment of the instrument-panel assembly 32 includes a first embodiment of the rotatable connection 40, the second embodiment of the instrument-panel assembly 32 includes a second embodiment of the rotatable connection 40, and the third embodiment of the instrument-panel assembly 32 includes a third embodiment of the rotatable connection 40. Common numerals are used to identify common features on the first embodiment, the second embodiment, and the third embodiment.

With reference to FIGS. 3A-B, the first embodiment of the instrument-panel assembly 32 may include a hinge 66 and a spring 68 spaced from the hinge 66. The rotatable connection 40 may be the hinge 66. The hinge 66 may have a first hinge portion 70 fixed relative to the instrument panel 34, a second hinge portion 72 fixed relative to the airbag housing 36, and a pin 74 connecting the first hinge portion 70 and the second hinge portion 72. The first hinge portion 70 may be connected to the casing 50 or to the instrument panel 34. The pin 74 may allow rotational motion of the second hinge portion 72 relative to the first hinge portion 70. Alternatively, the hinge 66 may be any type of hinge.

The spring 68 may be coupled to the airbag housing 36 and the instrument panel 34, or the spring 68 may be coupled to the airbag housing 36 and the casing 50. The spring 68 may be coupled indirectly to the instrument panel 34, for example, via the casing 50.

The spring 68 may be spaced from the rotatable connection 40. The spring 68 may bias the airbag housing 36 about the rotatable connection 40, that is, about the hinge 66. That is, the spring 68 may tend to exert a rotational force on the airbag housing 36 relative to the hinge 66.

The spring 68 may be a compression spring, that is, the spring 68 may extend and compress linearly along an axis around which coils of the spring 68 wind. The spring 68 may have one end coupled to the airbag housing 36 and another end coupled to the instrument panel 34 or the casing 50. The spring 68 may extend between the end coupled to the airbag housing 36 and the end coupled to the instrument panel 34 or the casing 50.

The release mechanism 82 may prevent the hinge 66 from moving until the release mechanism 82 is released. Each release mechanism 82 may be fixed to the first hinge portion 70 and to the second hinge portion 72. The release mechanism 82 may be released, that is, split into two components, one fixed to the first hinge portion 70 and one fixed to the second hinge portion 72. The release mechanism 82 may be released pyrotechnically, electromechanically, magnetically, etc. The release mechanism 82 may be in communication with the vehicle controller 56.

With reference to FIGS. 4A-B, the second embodiment of the instrument-panel assembly 32 may include the hinge 66 and the spring 68 mounted about the hinge 66. The rotatable connection 40 may be the hinge 66. The hinge 66 may have the first hinge portion 70 fixed relative to the instrument panel 34, the second hinge portion 72 fixed relative to the airbag housing 36, and the pin 74 connecting the first hinge portion 70 and the second hinge portion 72. The first hinge portion 70 may be connected to the casing 50 or to the instrument panel 34. The pin 74 may allow rotational motion of the second hinge portion 72 relative to the first hinge portion 70.

The spring 68 may be coupled to the airbag housing 36 and the instrument panel 34, or the spring 68 may be coupled to the airbag housing 36 and the casing 50. The spring 68 may be coupled indirectly to the instrument panel 34, for example, via the casing 50.

The spring 68 may be mounted about the hinge 66. In other words, coils of the spring 68 may wind around the rotational axis R of the rotatable connection 40, that is, the hinge 66. The spring 68 may bias the airbag housing 36 about the rotatable connection 40, that is, about the hinge 66. That is, the spring 68 may tend to exert a rotational force on the airbag housing 36 relative to the hinge 66.

The spring 68 may be a torsional spring, that is, the spring 68 may extend and compress by twisting or untwisting coils of the spring 68. Alternatively or additionally, the spring 68 may be a breakaway spring, that is, the spring 68 may have a threshold force and may break or yield if subjected to a force greater than the threshold force.

The release mechanism 82 may prevent the hinge 66 from moving until the release mechanism 82 is released. Each release mechanism 82 may be fixed to the first hinge portion 70 and to the second hinge portion 72. The release mechanism 82 may be released, that is, split into two components, one fixed to the first hinge portion 70 and one fixed to the second hinge portion 72. The release mechanism 82 may be released pyrotechnically, electromechanically, magnetically, etc. The release mechanism 82 may be in communication with the vehicle controller 56.

With reference to FIGS. 5A-B, the rotatable connection 40 of the third embodiment of the instrument-panel assembly 32 may include two slots 76 fixed relative to one of the instrument panel 34 and the airbag housing 36, and two bolts 78 fixed relative to the other of the instrument panel 34 and the airbag housing 36.

The two slots 76 may be fixed relative to one of the instrument panel 34 and the airbag housing 36, or more specifically the two slots 76 may be fixed relative to one of the casing 50 and the airbag housing 36. As shown in FIGS. 5A-B, the slots 76 are fixed relative to and extend through the casing 50. The slots 76 may be arranged laterally, that is, the two slots 76 may be spaced from each other on an axis parallel to the longitudinal axis L.

The two bolts 78 may be fixed relative to the other of the instrument panel 34 and the airbag housing 36 than the slots 76, or more specifically the two bolts 78 may be fixed relative to the other of the casing 50 and the airbag housing 36 than the slots 76. As shown in FIGS. 5A-B, the bolts 78 are fixed relative to and attached to the airbag housing 36. The bolts 78 may be releasably fixed to the slots 76. For example, the bolts 78 may be friction fit into the slots 76. The bolts 78 may be fixed relative to the slots 76 unless or until, e.g., a force pushing on one of the bolts 78 exceeds a force of friction from the slot 76 holding the bolt 78. Alternatively or additionally to the friction fit between the bolts 78 and the slots 76, springs (not shown), e.g., compression springs, may be disposed between the airbag housing 36 and the casing 50 or instrument panel 34. These compression springs may extend generally in parallel with the bolts 78 and may be concentric about the bolts 78.

Alternatively or additionally to the friction fit between the bolts and the slots 76, the release mechanisms 82 may prevent the bolts 78 from moving in the slots 76 until the release mechanisms 82 are released. Each release mechanism 82 may be fixed to the bolt 78 and to the slot 76. The release mechanism 82 may be released, that is, split into two components, one fixed to the bolt 78 and one fixed to the slot 76. The release mechanism 82 may be released pyrotechnically, electromechanically, magnetically, etc. The release mechanism 82 may be in communication with the vehicle controller 56.

In the event of an oblique frontal impact, the impact sensor 58 may detect the impact and transmit a signal through the communications network 62 to the vehicle controller 56. The vehicle controller 56 may transmit a signal through the communications network 62 to the inflator 60 and to the release mechanism 82. The inflator 60 may discharge and inflate the airbag 38. The release mechanism 82 may release the hinge 66 or the bolt 78 and slot 76. The airbag 38 may inflate from the undeployed position disposed in the instrument panel 34, as shown in FIG. 1, to the deployed position extended from the instrument panel 34, as shown in FIGS. 3A, 4A, and 5A. Because of the oblique angle of the impact, an occupant of the front seat 44 facing the airbag 38 will have a momentum at an oblique angle from a vehicle-forward direction, that is, the occupant will have both forward momentum and lateral momentum relative to the vehicle-forward direction. The occupant, specifically, the head 80 of the occupant, may travel forward into the airbag 38. The lateral momentum of the occupant may cause the airbag 38 and the airbag housing 36 to rotate about the rotational connection, as shown in FIGS. 3B, 4B, and 5B. Specifically, in the first and second embodiments, the spring 68 compresses or extends, and the airbag housing 36 rotates about the hinge 66. In the third embodiment, the force pushing on one of the bolts 78 exceeds the force of friction holding that bolt 78 in the slot 76, and the airbag housing 36 rotates about the other of the two bolts 78 in the other of the two slots 76. The rotation of the airbag 38 may absorb some of the lateral momentum of the occupant, reducing the possibility and/or amount that the head 80 of the occupant may be twisted relative to the airbag 38.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument-panel assembly comprising:
    an instrument panel extending along a longitudinal axis;
    an airbag housing supported by the instrument panel;
    an airbag supported by the airbag housing; and
    a rotatable connection rotatably supporting the airbag housing on the instrument panel, the rotatable connection being rotatable about a rotational axis transverse to the longitudinal axis.

2. The instrument-panel assembly of claim 1, wherein the rotatable connection is a hinge.

3. The instrument-panel assembly of claim 1, further comprising a spring coupled to the airbag housing and the instrument panel.

4. The instrument-panel assembly of claim 3, wherein the spring is spaced from the rotatable connection.

5. The instrument-panel assembly of claim 4, wherein the spring is a compression spring having one end coupled to the airbag housing and another end coupled to the instrument panel.

6. The instrument-panel assembly of claim 3, wherein the rotatable connection is a hinge, and the spring is mounted about the hinge.

7. The instrument-panel assembly of claim 6, wherein the spring is a torsional spring.

8. The instrument-panel assembly of claim 6, wherein the spring is a breakaway spring.

9. The instrument-panel assembly of claim 1, wherein the rotatable connection includes two slots fixed relative to one of the instrument panel and the airbag housing, and two bolts fixed relative to the other of the instrument panel and the airbag housing, the bolts being releasably fixed to the slots.

10. The instrument-panel assembly of claim 1, wherein the airbag is inflatable from an undeployed position to a deployed position, and wherein airbag has a conical shape at the airbag housing in the deployed position.

11. An airbag assembly comprising:
    an airbag housing;
    an airbag supported by the airbag housing;
    a rotatable connection coupled to the airbag housing, rotatable about a rotational axis extending substantially vertically; and a spring biasing the airbag housing about the rotatable connection.

12. The airbag assembly of claim 11, further comprising a casing, wherein the rotatable connection is coupled to the casing, and the spring is coupled to the airbag housing and the casing.

13. The airbag assembly of claim 12, wherein the spring is spaced from the rotatable connection.

14. The airbag assembly of claim 12, wherein the spring is a compression spring having one end coupled to the airbag housing and another end coupled to the casing.

15. The airbag assembly of claim 12, wherein the rotatable connection is a hinge and wherein the spring is mounted about the hinge.

16. The airbag assembly of claim 15, wherein the spring is a torsional spring.

17. The airbag assembly of claim 15, wherein the spring is a breakaway spring.

18. The airbag assembly of claim 11, wherein the airbag is inflatable from an undeployed position to a deployed position, and wherein airbag has a conical shape at the airbag housing in the deployed position.

19. An airbag assembly comprising:
   an airbag housing;
   an airbag supported by the airbag housing;
   a casing; and
   two bolts fixed to one of the casing and the airbag housing;
   wherein the other of the casing and the airbag housing includes two slots and the bolts are releasably fixed to the slots; and
   the slots are arranged horizontally.

20. The airbag assembly of claim 19, wherein the airbag is inflatable from an undeployed position to a deployed position, and wherein airbag has a conical shape at the airbag housing in the deployed position.

* * * * *